United States Patent
Shin et al.

(10) Patent No.: US 8,744,665 B2
(45) Date of Patent: Jun. 3, 2014

(54) CONTROL METHOD FOR LOCALIZATION AND NAVIGATION OF MOBILE ROBOT AND MOBILE ROBOT USING THE SAME

(75) Inventors: Kyung Chul Shin, Seoul (KR); Seong Ju Park, Incheon (KR); Hee Kong Lee, Seoul (KR); Jae Young Lee, Gyeonggi-do (KR); Hyung O Kim, Gyeonggi-do (KR)

(73) Assignee: Yujin Robot Co., Ltd., Seoul (KR)

( * ) Notice: Subject to any disclaimer, the term of this patent is extended or adjusted under 35 U.S.C. 154(b) by 209 days.

(21) Appl. No.: 13/387,715

(22) PCT Filed: Jul. 28, 2009

(86) PCT No.: PCT/KR2009/004204
§ 371 (c)(1),
(2), (4) Date: Apr. 13, 2012

(87) PCT Pub. No.: WO2011/013862
PCT Pub. Date: Feb. 3, 2011

(65) Prior Publication Data
US 2012/0191287 A1    Jul. 26, 2012

(51) Int. Cl.
G06K 9/46 (2006.01)
G05B 15/00 (2006.01)
G01C 22/00 (2006.01)
G05D 1/00 (2006.01)

(52) U.S. Cl.
USPC ............ 701/28; 701/523; 700/259; 700/245; 382/153; 382/190; 382/199; 382/201

(58) Field of Classification Search
None
See application file for complete search history.

(56) References Cited

U.S. PATENT DOCUMENTS

| | | | | |
|---|---|---|---|---|
| 4,628,453 A | * | 12/1986 | Kamejima et al. | 701/28 |
| 5,881,171 A | * | 3/1999 | Kinjo | 382/199 |
| 5,911,767 A | * | 6/1999 | Garibotto et al. | 701/28 |
| 5,961,571 A | * | 10/1999 | Gorr et al. | 701/494 |
| 6,449,382 B1 | * | 9/2002 | Ciccolo et al. | 382/103 |
| 6,496,754 B2 | * | 12/2002 | Song et al. | 700/245 |
| 6,577,775 B1 | * | 6/2003 | Li | 382/274 |
| 6,678,406 B1 | * | 1/2004 | Mojsilovic et al. | 382/162 |
| 6,813,370 B1 | * | 11/2004 | Arai | 382/104 |
| 7,590,304 B2 | * | 9/2009 | Kondo et al. | 382/274 |
| 7,634,336 B2 | * | 12/2009 | Chae et al. | 701/28 |
| 2002/0114499 A1 | * | 8/2002 | Breitenstein et al. | 382/128 |

(Continued)

FOREIGN PATENT DOCUMENTS

| | | |
|---|---|---|
| JP | 06-134687 A | 5/1994 |
| JP | 2009-193097 A | 8/2009 |
| KR | 10-0791382 B1 | 1/2008 |

OTHER PUBLICATIONS

Harris, et al., A Combined Corner and Edge Detector (Proceedings of the Fourth Alvey Vision Conference, Manchester, pp. 147-151, 1998.

*Primary Examiner* — Fadey Jabr
*Assistant Examiner* — Kevin P Mahne
(74) *Attorney, Agent, or Firm* — Husch Blackwell LLP

(57) ABSTRACT

The present invention relates to a control method for the localization and navigation of a mobile robot and a mobile robot using the same. More specifically, the localization and navigation of a mobile robot are controlled using inertial sensors and images, wherein local direction descriptors are employed, the mobile robot is changed in the driving mode thereof according to the conditions of the mobile robot, and errors in localization may be minimized.

18 Claims, 8 Drawing Sheets

(56) References Cited

U.S. PATENT DOCUMENTS

| | | | |
|---|---|---|---|
| 2002/0164085 A1* | 11/2002 | Norimatsu | 382/275 |
| 2004/0076324 A1* | 4/2004 | Burl et al. | 382/153 |
| 2005/0033474 A1* | 2/2005 | Kim et al. | 700/245 |
| 2005/0065655 A1* | 3/2005 | Hong et al. | 700/245 |
| 2005/0267631 A1* | 12/2005 | Lee et al. | 700/245 |
| 2006/0100742 A1* | 5/2006 | Park | 700/259 |
| 2006/0165276 A1* | 7/2006 | Hong et al. | 382/153 |
| 2007/0090973 A1* | 4/2007 | Karlsson et al. | 340/995.22 |
| 2007/0282484 A1* | 12/2007 | Chung et al. | 700/245 |
| 2008/0065267 A1* | 3/2008 | Hong et al. | 700/245 |
| 2009/0024251 A1* | 1/2009 | Myeong et al. | 700/259 |
| 2009/0028387 A1* | 1/2009 | Jeong et al. | 382/103 |
| 2009/0055020 A1* | 2/2009 | Jeong et al. | 700/251 |
| 2009/0062958 A1* | 3/2009 | Morris et al. | 700/252 |
| 2009/0143913 A1* | 6/2009 | Kim et al. | 700/259 |
| 2009/0149994 A1* | 6/2009 | Kim et al. | 700/258 |
| 2009/0208108 A1* | 8/2009 | Shimano et al. | 382/190 |
| 2009/0210092 A1* | 8/2009 | Park et al. | 700/259 |
| 2009/0226076 A1* | 9/2009 | Sakai et al. | 382/149 |
| 2009/0263009 A1* | 10/2009 | Krishnaswamy et al. | 382/154 |
| 2010/0001991 A1* | 1/2010 | Jeong et al. | 345/418 |
| 2010/0070078 A1* | 3/2010 | Kong et al. | 700/259 |
| 2010/0070125 A1* | 3/2010 | Lee et al. | 701/28 |
| 2010/0324773 A1* | 12/2010 | Choi et al. | 701/26 |
| 2011/0090337 A1* | 4/2011 | Klomp et al. | 348/144 |
| 2011/0112759 A1* | 5/2011 | Bast et al. | 701/202 |
| 2011/0123120 A1* | 5/2011 | Quack | 382/197 |
| 2011/0142350 A1* | 6/2011 | Tang et al. | 382/195 |
| 2011/0282565 A1* | 11/2011 | Law et al. | 701/117 |
| 2013/0197794 A1* | 8/2013 | Bast et al. | 701/410 |

* cited by examiner

FIG. 2

| -1 | 0 | 1 |
|----|---|---|
| -2 | 0 | 2 |
| -1 | 0 | 1 |

(a)

| -1 | -2 | -1 |
|----|----|----|
| 0  | 0  | 0  |
| 1  | 2  | 1  |

(b)

(a)

(b)

CONTROL METHOD FOR LOCALIZATION AND NAVIGATION OF MOBILE ROBOT AND MOBILE ROBOT USING THE SAME

CROSS REFERENCE TO RELATED APPLICATIONS

This application is a U.S. National Phase Application of International Application PCT Application No. PCT/KR2009/004204 filed on Jul. 28, 2009. The disclosure of International Application PCT Application No. PCT/KR2009/004204 is incorporated herein by reference.

TECHNICAL FIELD

The present invention relates to a control method for localization and navigation of a mobile robot and a mobile robot using the same. More specifically, the present invention relates to a control method for localization and navigation of a mobile robot and a mobile robot using the same that may employ local direction descriptors when the localization and navigation of the mobile robot are controlled using inertial sensors and images, change the driving mode of the mobile robot according to the conditions of the mobile robot, and minimize errors in localization.

BACKGROUND ART

Recently, due to the advancement in robot technologies, mobile robots that set a path and move by itself have been utilized. Representative examples of mobile robots include a cleaning robot that cleans houses or buildings and a receptionist robot that helps to find a location. Especially, the cleaning robot includes various sensors and driving units to clean indoor floors using a vacuum cleaning unit provided therein while traveling. Currently, various cleaning robots are currently used.

In order to efficiently judge the position and move the mobile robot, the mobile robot is required to generate a map for the space where the robot is moving and recognize the location in the space. Simultaneous localization and mapping (SLAM) refers that the mobile robot recognizes the location in the surrounding space and generates a map.

Among the SLAM techniques, an image based SLAM generates the map regarding the circumference environment using a visual feature point extracted from an image and estimates a posture of the robot. Generally, the mobile robot is driven by a dead reckoning method using a gyroscope and an encoder provided in a driving motor. Further, the mobile robot uses a camera provided at the upper part to analyze an image and generate a map. In this case, if there is an error in driving information generated by the gyroscope and the encoder, the accumulated error is corrected by using image information obtained from the camera.

Until now, even though various related arts regarding a mobile robot driving control method and a mobile robot using the same are suggested, the following problems have not been solved.

Even though various methods are used as a descriptor for a feature point extracted from the image, excellent performance cannot be achieved in a case when change in the illumination or image is significant. Further, when the driving of the mobile robot is controlled, if the input image cannot be used or an error occurs in the driving control of the mobile robot, an adaptive driving control method cannot be suggested. Furthermore, in the feature point matching, wrong feature points are recognized as the same feature points.

DISCLOSURE

Technical Problem

In order to solve the above problems, an object of the present invention is to provide a control method of localization and navigation of a mobile robot and a mobile robot using the same that employs local direction descriptors when the localization and navigation of the mobile robot are controlled using inertial sensors and images and changes the driving mode of the mobile robot according to the conditions of the mobile robot to minimize errors during localization.

Technical Solution

In order to achieve the above object, an exemplary embodiment of the present invention provides a mobile robot, including: an image obtaining unit configured to obtain an image; a sensor unit configured to obtain driving information including at least a driving direction and a driving distance of the mobile robot; an image processing unit configured to process the image obtained by the image obtaining unit to extract a feature point and generate a descriptor for the feature point; and a main controller configured to generate a spatial map in a driving range based on the feature point and the driving information and control localization and navigation of the mobile robot. When the localization and the navigation of the mobile robot are performed, depending on the matching degree of the obtained image and a reference image, the main controller selectively applies a first driving mode that simultaneously uses the image and the sensing information and a second driving mode that uses only the image information.

The mobile robot may further include: a storing unit configured to store the driving information including the driving direction and the driving distance of the mobile robot obtained by the sensor unit and image information including the feature point obtained by the image processing in the image processing unit and descriptor information.

The image processing unit may include: an image distortion correcting unit configured to correct the distortion of the image obtained by the image obtaining unit; an image quality checking unit configured to determine whether the image is available; a feature point extracting unit configured to extract the feature point from the image; and a descriptor generating unit configured to generate a descriptor for the feature point.

The image quality checking unit may determine the availability of the obtained image by comparing a brightness of the obtained image and a brightness of the reference image.

When the image obtaining unit obtains an abnormal image in the first driving mode and a time when the abnormal image is obtained exceeds a predetermined time, the image quality checking unit may determine that the mobile robot is blocked in a block area.

The image quality checking unit may determine whether the image obtaining unit is blocked, based on an average and a variation of the brightness of the obtained image.

If it is determined that the mobile robot is blocked in the block area, the main controller may return the mobile robot to an entering point of the block area.

The image quality checking unit may divide the obtained image into four sections with reference to a moving direction of the mobile robot and determine whether the mobile robot is blocked based on an average and a variation of the obtained image based on the brightness average in the divided sections.

The descriptor generating unit may generate change in brightness and direction information for n×n sub regions divided from the obtained image.

The descriptor generating unit may select direction information of different two sub regions in the n×n sub regions to generate a pair-wise combination to describe the angle difference in local direction information.

The main controller may include: a driving mode selecting unit configured to select the first driving mode and the second driving mode; a feature point management unit configured to manage the feature point extracted from the image and match to the registered feature point; a map management unit configured to generate and update the map; and a driving control unit configured to control the localization and navigation of the mobile robot.

When the mobile robot is kidnapped while driving in the first driving mode or fails to establish a metric map or localize during a predetermined image frame, the driving mode selecting unit may switch the driving mode to the second driving mode to restore the position in accordance with a topological map.

Another exemplary embodiment of the present invention provides a control method of localization and navigation of a mobile robot, including: (a) allowing the mobile robot to obtain image information and driving information of a target region; (b) determining whether the obtained image is available by comparing a quality of the obtained image information with a reference value; and (c) if it is determined that the image is available, extracting a feature point from the obtained image information and generating a descriptor of the extracted feature point to create a driving map and drive in the target region. When the localization and the navigation of the mobile robot are performed, depending on the matching degree of the obtained image and a reference image, the driving in the target region includes: selecting any one of a first driving mode that simultaneously uses the image and the sensing information and a second driving mode that uses only the image information.

The control method, before (b), may further include: correcting distortion of the obtained image information.

The generating of the descriptor may include: generating a descriptor including at least direction information and brightness information for the feature point; registering the feature point if the feature point is determined as a new feature point; generating a descriptor for a key area feature point when the feature point is the key area feature point that represents a feature of a predetermined region; and registering the key area feature point if the key area feature point is determined as a new key area feature point.

The generating of the descriptor for the key area feature point, the key area feature point may be spatially uniformly generated in the obtained image and set in a region where the sum of values of a corner response function calculated from an image in one frame is larger than a reference value.

The generating of the descriptor for the key area feature point, the mobile robot may correct a positional error accumulated by the image matching of the feature point of the image obtained in the key area and the key area feature point and a direction angle error.

In the selecting of the driving mode, when the brightness of the image obtained by the mobile robot in the first driving mode is below a reference and a time when the image below the reference is obtained exceeds a predetermined time, it may be determined that the mobile robot is blocked in a block area.

In the selecting of the driving mode, if it is determined that the mobile robot is blocked in the block area, the mobile robot may be returned to an entering point of the block area.

In the selecting of the driving mode, it may be determined whether the mobile robot is blocked based on an average and a variation of the obtained image based on the brightness average in sections divided by dividing the obtained image into four sections with reference to a moving direction of the mobile robot.

The driving in the target region may include in the first driving mode: measuring an average of a total brightness of the obtained image and comparing the average with a brightness average of the reference image to estimate an illumination environment; measuring the brightness average and variation of the image that is divided into four sections and comparing with the brightness average and variation of the reference image to sense change in the illumination; and adjusting a speed of the mobile robot based on the estimated illumination environment and the sensed change in the illumination.

In the first driving mode, change in brightness and direction information for n×n sub regions divided from the obtained image may be generated.

In the first driving mode, direction information of different two sub regions of the n×n sub regions may be selected to generate a pair-wise combination to describe the angle difference in local direction information.

When the mobile robot is kidnapped while driving in the first driving mode or fails to establish a metric map or localize during a predetermined image frame, the selecting of the driving mode may switch the driving mode to the second driving mode to restore the position in accordance with a topological map.

Advantageous Effects

When driving information obtained from an inertial sensor cannot be sufficiently used due to the condition of the mobile robot, the localization and navigation of the mobile robot can be controlled only by image matching to allow circumstantial adaptive mobile robot control.

According to a method of generating a descriptor for an image feature point suggested by this invention, the amount of calculation is reduced and wrong recognition rate is reduced. Further, the method is strong in rotational change.

Further, according to the present invention, it is possible to improve a feature point recognition rate by comparing the driving information of the mobile robot and the directional information extracted from the image feature point.

DESCRIPTION OF DRAWINGS

FIG. 2 is a diagram illustrating a window for calculating a gradient of an image.

BEST MODE

Hereinafter, exemplary embodiments of the present invention will be described with reference to the accompanying drawings. In the figures, reference numbers refer to the same or equivalent parts of the present invention throughout the several figures of the drawings. Further, in the description of this invention, if it is determined that the detailed description of the configuration or function of the related art may unnecessarily deviate from the gist of the present invention, the detailed description of the related art will be omitted. Hereinafter, preferred embodiment of this invention will be described. However, the technical idea is not limited thereto, but can be modified or performed by those skilled in the art.

Figure 1:
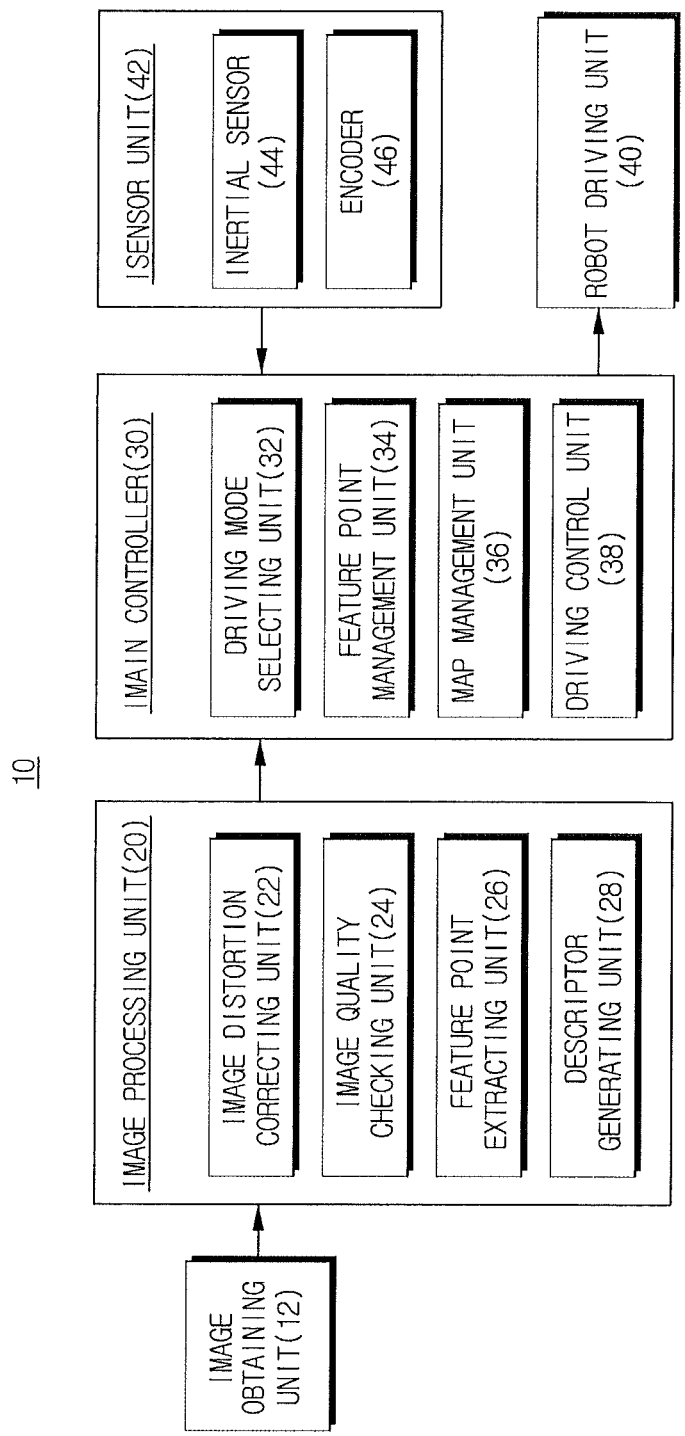
FIG. 1 is a block diagram showing a configuration of a mobile robot according to an exemplary embodiment of the invention.

FIG. 1 is a block diagram showing a configuration of a mobile robot according to an exemplary embodiment of the invention.

A mobile robot 10 according to an exemplary embodiment of the present invention includes an image obtaining unit 12 configured to obtain an image, an image processing unit 20 configured to process the image obtained by the image obtaining unit 12, extract a feature point in the image, and generate a descriptor for the feature point, a sensor unit 42 configured to sense moving direction information of the mobile robot 10 and a moved distance, a main controller 30 configured to generate a map for a space where the mobile robot is moving based on the obtained image and control the operation of the mobile robot based on information on the feature point extracted from the obtained image and the driving information obtained from the sensor unit 42, and a robot driving unit 40 configured to drive the robot in accordance with the control of the main controller 30.

The image obtaining unit 12 obtains an image for a circumference environment where the mobile robot is located. The image obtaining unit 12 may include an image sensor such as a charged coupled device (CCD) or a complementary metal oxide semiconductor (CMOS). In the present invention, the image obtaining unit 12 may be disposed toward the upper direction to obtain a ceiling image. More preferably, the image obtaining unit 12 includes a wide angle lens such as a fisheye lens to obtain a ceiling image in a wide viewing range.

The image processing unit 20 includes an image distortion correcting unit 22, an image quality checking unit 24, a feature point extracting unit 26, and a descriptor generating unit 28.

The image distortion correcting unit 22 is configured to correct the distortion of an image obtained by the image obtaining unit 12. When the image obtaining unit 12 includes a fisheye lens or a wide angle lens, the image obtained by the image obtaining unit 12 includes the radial distortion. Therefore, the image obtaining unit 12 removes the distortion of the image using a camera parameter that is obtained in advance.

The image quality checking unit 24 is configured to determine availability of the obtained image. When a direct light is irradiated onto the image obtaining unit 12 or the image obtaining unit 12 is blocked by an obstacle such as a table, the image obtained by the image obtaining unit 12 may be not useful to localize the mobile robot. Accordingly, the image quality checking unit 24 checks the obtained image and excludes the obtained image if the obtained image is not useful. For example, if the brightness of the obtained image is too high or too low, the image quality checking unit 24 processes the image as an improper image. When the obtained image is excluded, the main controller 30 controls the movement of the mobile robot based on driving record information obtained from a gyroscope 44 or an encoder 46.

In stereo matching, which compares two images, if a disparity between the images is d, a focal length is F, a distance from eyes is z, and a baseline is B, the relationship is represented by the following Equation 1.

$$d = BF\frac{1}{z}$$ [Equation 1]

In a generalized continuous image sequence thereof, a short baseline is defined as a case when the difference between the images is not large and the feature point between the images is matched in a determined range. In contrast, a wide baseline is defined as a case when a viewpoint difference between the images is large or geometrical deformation or illumination change is contained so that the feature point between images is not matched.

The image quality checking unit 24 has an additional function configured to detect change in the brightness of an image obtained by the image obtaining unit 12 to detect that the mobile robot 10 moves under an obstacle such as a table. For example, an average brightness or a variation of the obtained image is used to detect that the image obtaining unit 12 of the mobile robot 10 is blocked by the obstacle.

If the mobile robot 10 enters under the table, the brightness average of an image frame is gradually reduced so that the variation of the brightness is increased and then decreased. As a method of reducing the amount of calculation, the image obtained by the image obtaining unit 12 is divided into four sections with reference to a moving direction of the mobile robot 10 and a brightness average of the divided sections is used to obtain an average and a variation in the brightness of the entire image to determine whether the mobile robot 10 is blocked.

If the image obtaining unit 12 is blocked by the obstacle, it is difficult to control the position of the mobile robot 10 based on the image. Therefore, the main controller 30 controls the movement of the mobile robot 10 based on information of an inertial sensor 44 such as a gyroscope or an encoder 46.

The feature point extracting unit 26 extracts a feature point from an image for a space obtained by the image obtaining unit 12. Examples of the feature point include a corner of the ceiling, a ramp installed on the ceiling, or a door provided in the space. However, if the ramp or the door is used to extract the feature point, the amount of calculation is increased. Therefore, the corner of the ceiling is preferably used as the feature point. However, the feature point extracted by the feature point extracting unit 26 in the present invention is not limited to the corner, but the above-mentioned feature points and various objects present in the space may be used as the feature point.

A technique that extracts the corner as the feature point will be described below.

An example of the corner extracting technique is a Harris corner detecting method. Chris Harris and Mike Stephens suggested a method of extracting a corner from an image in "A Combined Corner and Edge Detector (Proceedings of The Fourth Alvey Vision Conference, Manchester, PP 147-151, 1998)". Harris's method takes into account that the shift along the edge of the image has little difference but the movement vertical to the edge has big difference and the movement in all directions at the corner has a large difference.

If an intensity of the image is I and the change by the movement (x, y) in the image is E, E is represented by the following Equation 2.

$$E_{x,y} = \sum_{u,v} w_{u,v} |I_{x+u,y+v} - I_{u,v}|^2 \quad \text{[Equation 2]}$$

In Equation 2, w refers to an image window. Equation 2 may be represented by Equation 3, and the matrix M in Equation 3 refers to a gradient of an image intensity and is calculated by Equation 4.

$$E(x, y) = [x, y] M \begin{bmatrix} x \\ y \end{bmatrix} \quad \text{[Equation 3]}$$

$$M = \begin{bmatrix} \left(\frac{\partial I}{\partial x}\right)^2 & \left(\frac{\partial I}{\partial x}\right)\left(\frac{\partial y}{\partial x}\right) \\ \left(\frac{\partial I}{\partial x}\right)\left(\frac{\partial y}{\partial x}\right) & \left(\frac{\partial I}{\partial y}\right)^2 \end{bmatrix} \quad \text{[Equation 4]}$$

When an eigenvalue of the matrix M is calculated and the value is larger than a predetermined value and the relative ratio is smaller than a predetermined value, it is determined that the change in the intensity of the image is significant in all directions, which is defined by a response function of the corner and represented by Equation 5.

$$R = \det M - k(\text{trace } M)^2 \quad \text{[Equation 5]}$$

In Equation 5, a point where R is larger than 0 and R is a local maxima is determined as a corner.

The descriptor generating unit 28 generates a descriptor for the feature point extracted by the feature point extracting unit 26. As a descriptor for the feature point, a scale invariant feature transform (SIFT) or a speeded up robust feature (SURF) is utilized. An SIFT descriptor represents a feature using a distribution of change in the brightness of the image around the feature point. An SURF descriptor was suggested by Herbert Bay et al. in 2006 and has a characteristic that the dimension of the descriptor is reduced as compared with the SIFT to improve the speed and Haar Wavelet is applied so that the descriptor is stronger than a simple gradient.

The present invention newly suggests to utilize a local direction descriptor that has a lower wrong recognition rate and shorter performing time and is stronger in the rotational change as compared with the SIFT or SURF. The local direction descriptor will be described below.

The main controller 30 includes a driving mode selecting unit 32, a feature point management unit 34, a map management unit 36, and a driving control unit 38.

The driving mode selecting unit 32 is configured to select any one of a first driving mode that controls the posture and position of the mobile robot using the feature point extracted from the feature point extracting unit 26 and driving record information obtained from the inertial sensor 44 or the encoder 46 and a second driving mode that controls the driving by the image matching to control the driving of the mobile robot. The description of the first driving mode and the second driving mode will be described in detail below.

The feature point management unit 34 registers information on a newly obtained feature point in a feature database (not shown) and matches the feature point extracted from the obtained image with a feature point already registered in the feature point database to detect a matched feature point. The feature point matching performed in the feature point management unit 34 is determined by calculating an Euclidian distance between descriptors representing the feature points.

The map management unit 36 is configured to generate and update a map for a space where the mobile robot 10 is located based on the image obtained by the image obtaining unit 12 of the mobile robot 10, driving information such as moving direction and distance of the mobile robot 10, and the position of the feature point. In some cases, the map for the space is provided to the mobile robot 10 in advance. In this case, the map management unit 36 continuously updates the map based on information of an obstacle located in the space and the feature point information.

The driving control unit 38 is configured to control the driving of the mobile robot 10 based on the current position of the mobile robot 10 and the driving information. In an example for driving the mobile robot 10, the mobile robot 10 may include a left wheel (not shown) and a right wheel (not shown), and a left wheel driving motor (not shown) and a right wheel driving motor (not shown) as a robot driving unit 40 for driving the left wheel and the right wheel. The driving control unit 38 controls the rotation of the left wheel driving motor and the right wheel driving motor to allow the mobile robot to be driven for example, forward, backward, left, and right. In this case, the left wheel driving motor and the right wheel driving motor include the encoder 46, respectively to obtain driving information of the left wheel driving motor and the right wheel driving motor.

In the meantime, the driving control unit 38 is configured to estimate the position of the feature point and the position of the mobile robot in the future based on the current position of the feature point and the current position of the mobile robot by utilizing an extended Kalman filter (EKF) so as to control the driving of the mobile robot 10.

In the above-described configuration, the inertial sensor 44 senses the inertia to confirm the heading direction of the mobile robot 10. Sensing information of the inertial sensor 44 and sensing information of the encoder 46 constitute driving information (odometry) of the mobile robot 10. If the sensing information of the inertial sensor 44 and the encoder 46 is correct, the mobile robot may be perfectly controlled only by the driving information obtained those from. However, in the actual situation, the actual position of the mobile robot 10 may differ from the position calculated based on the driving information due to the slipping of a driving wheel or an error of sensor information. These errors may be corrected by using an image obtained by the image obtaining unit 12.

As described above, the descriptor generating unit 28 of the mobile robot 10 according to the present invention generates the descriptor for the feature point of the image. The present invention suggests the local direction descriptor as the descriptor for the feature point.

The local direction descriptor deducts a local orientation through a gradient of the circumference of the feature point and is generated based on the relationship between the local orientations.

Figure 3:
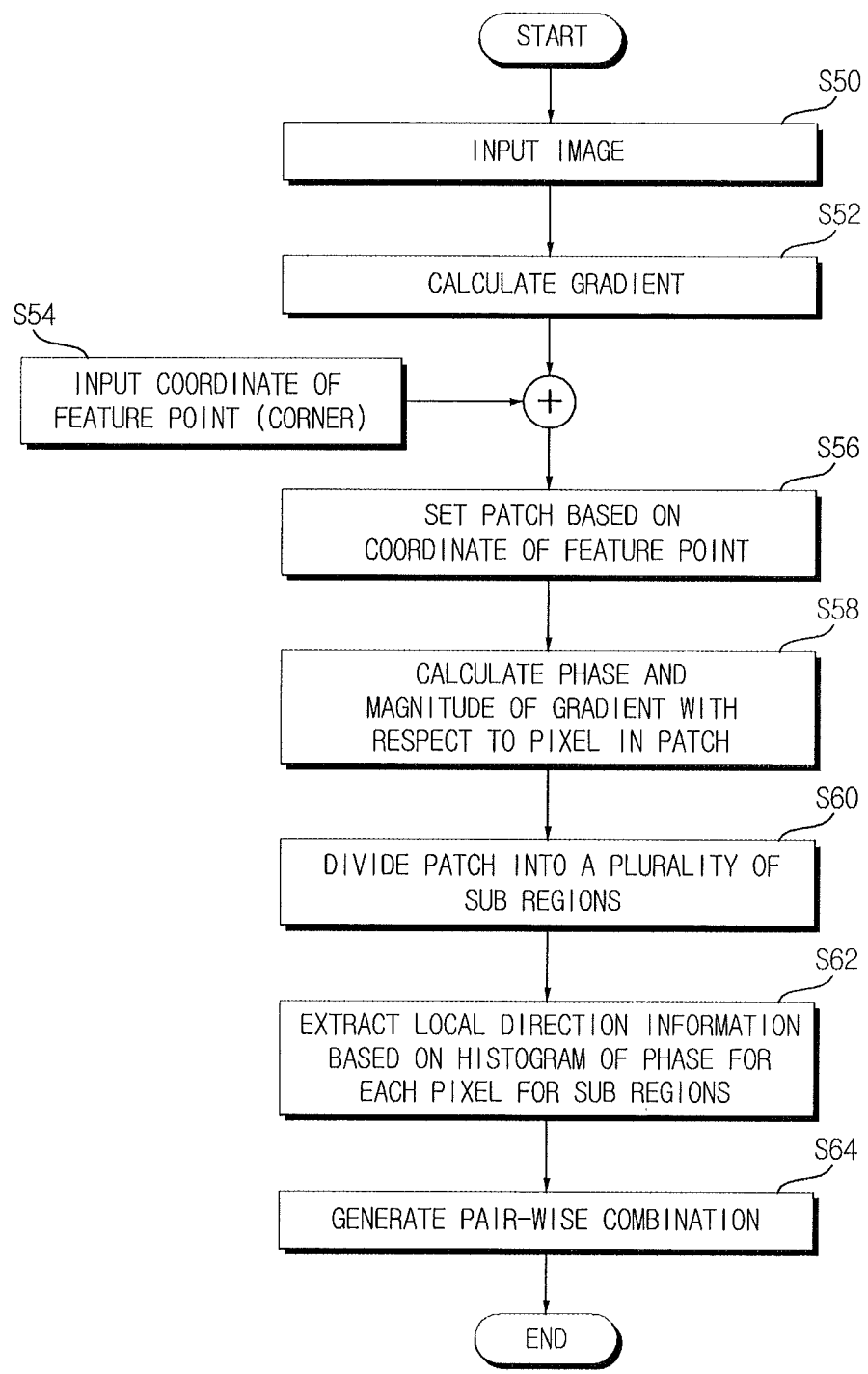
FIG. 3 is a diagram showing a process of generating a local direction descriptor in a mobile robot according to an exemplary embodiment of the invention.

FIG. 3 is a diagram showing a process of generating a local direction descriptor in a mobile robot according to an exemplary embodiment of the invention.

Figure 2:
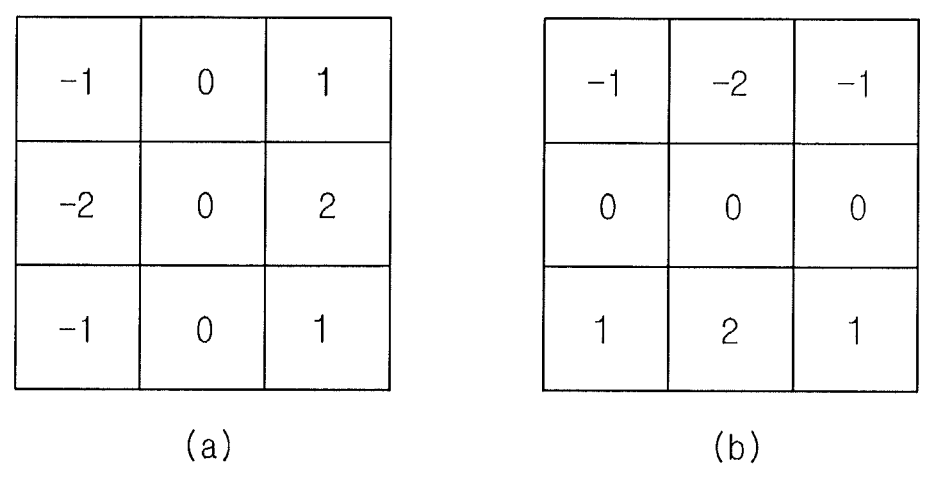

An image obtained from the image obtaining unit 12 is input (S50), and gradients for respective pixels of the image are calculated (S52). The gradient is calculated such that a window shown in FIG. 2 is applied to the respective pixels in the image to calculate a horizontal gradient dx and a vertical gradient dy. The horizontal gradient dx is calculated as a sum obtained by multiplying an intensity value of the pixel by respective values of the horizontal window and the vertical gradient dy is calculated as a sum obtained by multiplying an intensity value of the pixel by respective values of the vertical window.

A coordinate of the feature point (preferably, corner) extracted by the feature point extracting unit 26 is input (S54), an image patch having the feature point as a center is set (S56). When the image patch is set, for example, 9×9 pixels may be specified. However, the size of the image patch is not actually limited thereto, but is variable depending on the input image or applied environment.

Using the gradient for the respective pixels in the image patch, a phase and a magnitude of the gradient in the respective pixels are calculated (S58). The phase is calculated by Equation 6 and the magnitude is calculated by Equation 7. In Equations 6 and 7, dx indicates a horizontal gradient for a specific pixel and dy indicates a vertical gradient for a specific pixel.

$$\text{phase} = \arctan\left(\frac{dy}{dx}\right) \quad \text{[Equation 6]}$$

$$\text{magnitude} = \sqrt{dx^2 + dy^2} \quad \text{[Equation 7]}$$

Next, the image patch is divided again into smaller sections to generate a plurality of sub regions (S60). In the exemplary embodiment, 9×9 image patch is divided into 3×3 sub regions to be 9 sub regions.

Figure 4:
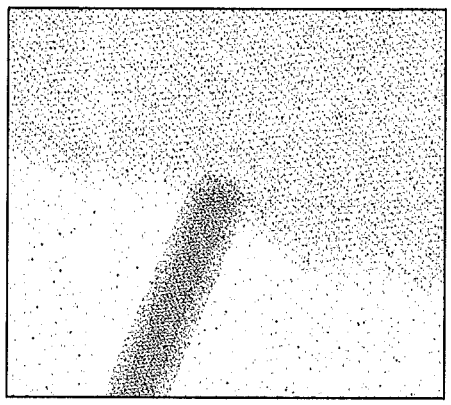
FIG. 4A is a diagram showing an example of an image patch and FIG. 4B is a diagram showing an example of local direction information for a sub area of the image patch.
Figure 4:
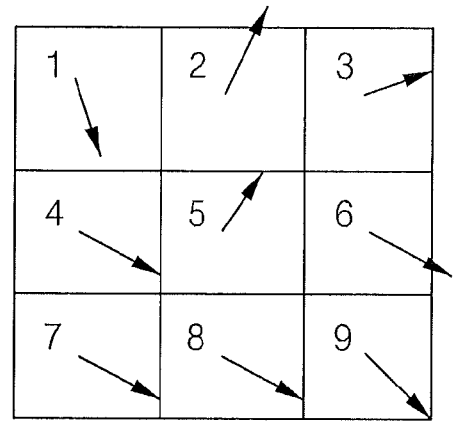

For the respective sub regions, a histogram for phases of the respective pixels of the sub region is created to indicate the phase corresponding to a peak value as a local direction in a corresponding sub region (S62). FIG. 4A shows an example of an image patch and FIG. 4B shows local direction information for a sub region of the image patch. As shown in FIG. 4B, it is confirmed that a total of 9 pieces of local direction information are extracted.

Every two pieces of extracted local direction information in the sub region are paired to create a pair-wise combination and the difference in angle of the local orientation information of the respective combinations is recorded as descriptors (S64). If 9 local orientations are extracted, a total of 36 pair-wise combinations are created (1-2, 1-3, 1-4, . . . , 8-9) and a descriptor for a specific feature point may be represented by 36 values. However, in the descriptor according to the present invention, it should be understood that the 9 pieces of local direction information created as the pair-wise combinations is an example for generating the relationship of local direction information. However, the local direction information may be used as a descriptor itself or a descriptor corresponding to another combination.

The above-described local direction descriptor has advantages in that the wrong recognition rate is reduced, less time for feature point matching is required, and the local direction descriptor is stronger in rotational change, as compared with descriptors in the related art.

Next, the function of the driving mode selecting unit 32 and the driving control of the mobile robot 10 in response to the driving mode selection of the driving mode selecting unit 32 will be described.

This relationship is applied to the driving control of the mobile robot 10 as follows:

The mobile robot 10 estimates the position based on the driving information of the inertial sensor 44 and the encoder 46 and generates a map in real time. The driving control unit 38 utilizes the EKF to match the feature point between images that are sequentially obtained by the image obtaining unit 12 using the matching range estimated from the moving direction and moving distance of the mobile robot 10, which is defined as "a short baseline driving mode".

In the short baseline driving mode, the location and driving of the mobile robot 10 is controlled within a range estimated by the EKF of the driving control unit 38. The image obtained by the image obtaining unit 12 is processed to extract a feature point, generate a descriptor for the feature point, and match the feature point using the generated descriptor, thereby estimating the correct position of the mobile robot 10 to correct the position of the mobile robot 10 in accordance with the driving information (ordometry).

If there is a serious error in the driving information obtained from the inertial sensor 44 and the encoder 46 by the mobile robot 10, it is difficult for the driving control unit 38 to estimate the position of the mobile robot 10 using the EKF to correct the position by extracting the feature point from the image. For example, if an obstacle blocks the mobile robot 10 during the movement of the mobile robot 10, even though the driving motor of the robot driving unit 40 rotates, the position of the mobile robot 10 does not change. However, since the encoder 46 senses the rotation of the driving motor, the driving control unit 38 determines that the mobile robot 10 is moving. In this case, it is difficult to estimate the position of the mobile robot 10. Otherwise, even when the driving wheel of the mobile robot 10 slips, but is not driven, or rotates in a undesired direction, the error by the position estimation of the mobile robot 10 may not be overcome. In this case, the mobile robot 10 is controlled to be driven in a wide baseline driving mode not the short baseline driving mode.

In the wide baseline driving mode, the driving information of the inertial sensor 44 and the encoder 46 is not used, but the position of the mobile robot 10 is determined and driving thereof is controlled by matching the images obtained by the image obtaining unit 12.

However, in the short baseline driving mode, since the feature point extracted from the image based on the driving information and the estimated position of the mobile robot 10 is utilized, generally the accuracy of the feature point is not high. Therefore, the feature points in different position may be erroneously recognized as the same. In contrast, in the wide baseline driving mode, the position of the mobile robot 10 is estimated by utilizing only image matching. Therefore, accuracy does not need to be high.

The feature point extracting unit 26 extracts a feature point whose strength is higher than a predetermined value (first reference value) as a feature point, and the descriptor generating unit 28 generates a descriptor for the feature point, which are used in the short baseline driving mode. Since a more accurate feature point is required in the wide baseline driving mode, among the feature points extracted by the feature point extracting unit 26, feature points whose strength is higher than a second reference value (>first reference value) are managed as a key area feature point by the feature point management unit 34. If a corner of an image is used as a feature point, the feature point may be extracted based on a corner response function value according to Equation 4. If the corner response function value is larger than the second reference value, the corner response function value may be set as the key area feature point.

Preferably, the key area feature point is set to be spaced apart from the space where the mobile robot 10 operates with a predetermined distance, which is for preventing the key area feature point from overlapping a specific area. Therefore, if an object of the key area feature point is extracted to overlap a specific area, any one of them may be selected.

In the meantime, a local direction descriptor for the key area feature point is generated using an image around the extracted corner to represent the entire image as a kd-tree type. In the wide baseline driving mode, the feature point is extracted as a kd-tree type from the image obtained by the image obtaining unit 12 to determine the similarity with the registered key area feature point. In this case, in order to accelerate the calculation speed, a best bin first (BBF) algorithm is applied and a random sample consensus (RANSAC) algorithm is used to lower the error rate.

The driving mode selecting unit 32 selects to control the driving of the mobile robot 10 in the short baseline driving mode (first driving mode) in a basic situation, and selects to control the driving of the mobile robot 10 in the wide baseline driving mode (second driving mode) in a specific situation described above. When the driving of the mobile robot 10 is controlled in the wide baseline driving mode, the main controller 30 extracts a key area feature point from the image obtained by the image obtaining unit 12 and matches the key area feature point to the already stored key area feature point to control the driving of the mobile robot 10. When the position of the mobile robot 10 on the map is restored, the mode is changed to the short baseline driving mode.

That is, the corner extracting method is basically same as the Harris corner method. However, in case of a cleaning robot, the difference between the images is too big to directly apply the KLT algorithm. In contrast, in case of using the SIFT algorithm that represents the wide baseline driving mode to match the images, it takes so much time to match the image, which is not appropriate for real time application.

As described above, the present invention establishes two maps for allowing the mobile robot to be driven in the target area, for example, a metric map generated in a short baseline driving mode and a topological map based on an upper image to restore the position in the wide baseline driving mode.

The metric map selects corners that are easily tracked likes a KLT tracker, aligns the corners in accordance with the corner response function and then locally uniformly distributes the corners to generate a map landmark using the EKF with reference to the odormetry information. In the present invention, the landmark is represented using direction descriptors individually around the corner in the metric map. Therefore, strong distinguishment is individually allowed to be strong for a wall surface where affine deformation occurs or illumination changes.

Further, the topological map extracts more corners such as object recognition and removes the limitation of the local maxima for an image that the sum of the response function of the corners extracted in the metric map is larger than a predetermined threshold, which is different from the metric map. The local direction descriptor around the corners that are more extracted is generated to represent the entire as a kd tree. Later, this is used to estimate the pose between the images to restore the position of the mobile robot.

Therefore, in the present invention, the mobile robot starts to drive in the first driving mode and then switches the mode to the second driving mode in case when the mobile robot fails to notice the kidnap (uses a bottom IR sensor or gyro odometry) or in case when the metric map matching is failed for a predetermined frame or more. In the second driving mode, when the map matches, the position restoring is tried in the topology map using the image stored as the kd tree and the BBF and RANSAX algorithms.

The control method for navigation of the mobile robot 10 described above will be described below.

Figure 5:
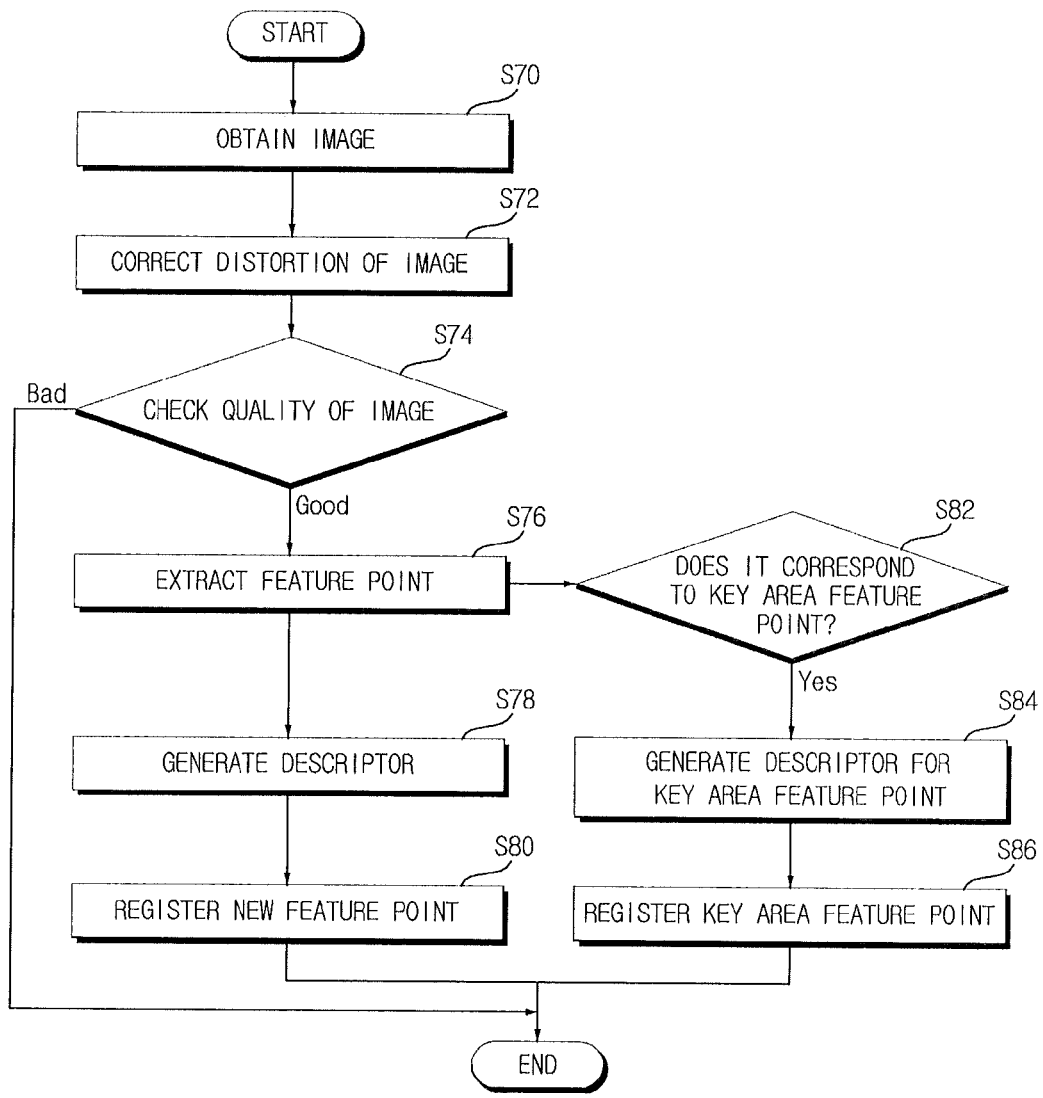
FIG. 5 is a flowchart showing a process of extracting a feature point and generating an identifier in a control method for localization and navigation of a mobile robot according to an exemplary embodiment of the invention.

FIG. 5 is a flowchart showing a process of extracting a feature point and generating an identifier in a control method for localization and navigation of a mobile robot according to an exemplary embodiment of the invention.

The image obtaining unit 12 obtains an image for the circumference environment of the mobile robot 10 (S70). The image distortion correcting unit 22 corrects the distortion of the obtained image (S72). The image quality checking unit 24 checks the quality of the image (S74). Only when the quality of the image is appropriate for extracting the feature point, the next sequence may be performed.

The feature point extracting unit 26 extracts the feature point from the input image (S76), the descriptor generating unit generates a descriptor for the feature point (S78), and then if the generated feature point is new, the feature point management unit 34 registers and manages the generated feature point (S80).

In the meantime, if it is determined that the feature point extracted by the feature point extracting unit 26 corresponds to a key area feature point (S82), a descriptor for the key area feature point is generated (S84), and if the key area feature point is new, the feature point management unit 34 registers and manages the key area feature point (S86).

Figure 6:
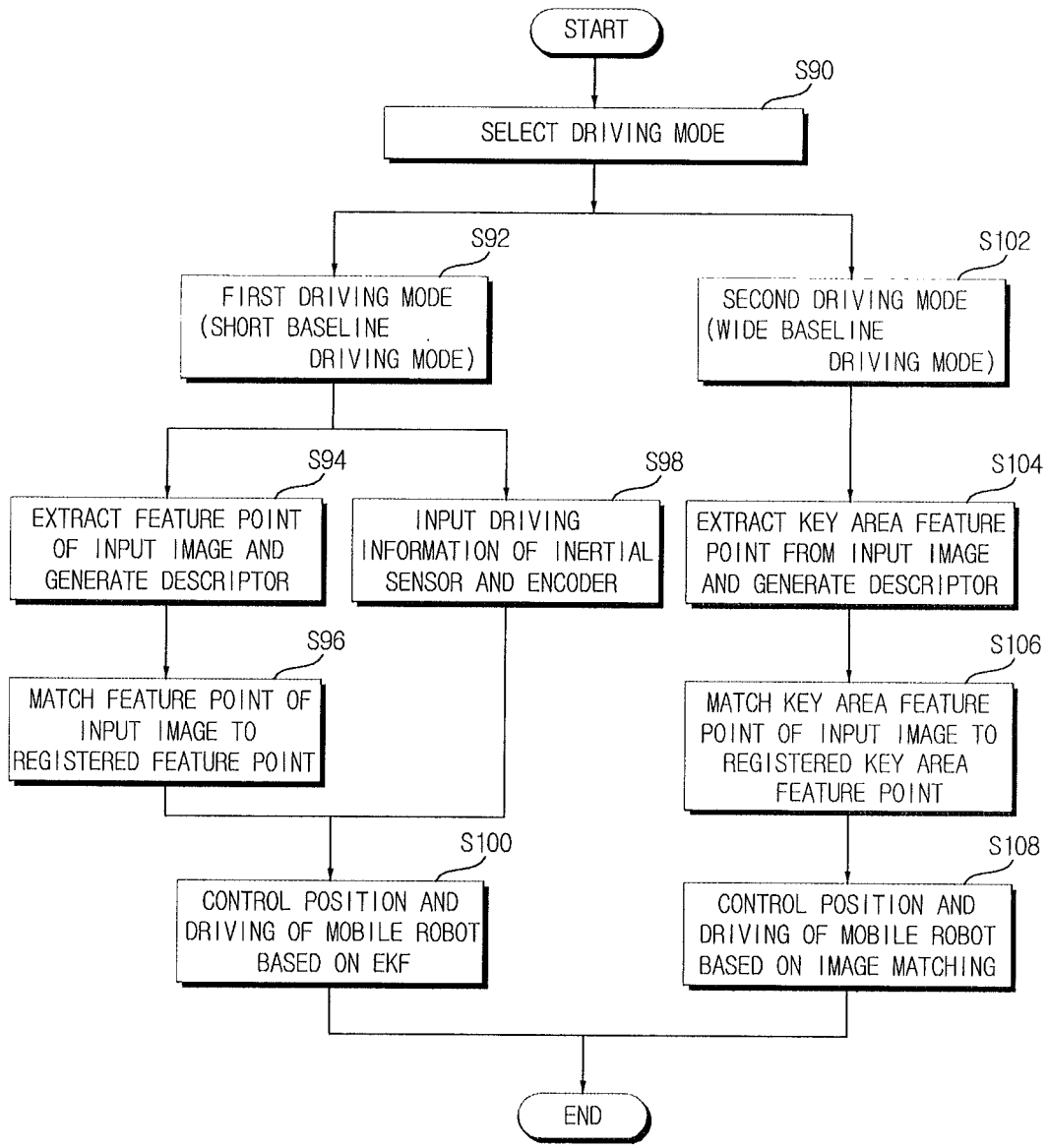
FIG. 6 is a flowchart showing a driving mode selection and driving control method in a control method for localization and navigation of a mobile robot according to an exemplary embodiment of the invention.

FIG. 6 is a flowchart showing a driving mode selection and driving control method in a control method for localization and navigation of a mobile robot according to an exemplary embodiment of the invention.

The driving mode selecting unit 32 selects the driving mode in accordance with the driving status of the mobile robot 10 (S90).

Generally, the driving mode selecting unit 32 selects the first driving mode (short baseline driving mode) to control the localization and the navigation based on the driving information obtained from the inertial sensor 44 and the encoder 46 and the feature point of the input image.

When the first driving mode is selected, the feature point for the input image obtained by the image obtaining unit 12 is extracted and a descriptor for the feature point is generated (S94). Next, the descriptor generated for the input image is used to match the feature point of the input image to the registered feature point (S96).

In the meantime, the main controller 30 receives the driving information of the mobile robot 10 from the inertial sensor 44 and the encoder 46.

The driving control unit 38 estimates the position of the mobile robot based on the driving information of the mobile robot 10 and corrects the position of the mobile robot based on the input image to control the driving of the mobile robot (S100).

However, if the mobile robot is blocked by the obstacle or slips, the driving mode selecting unit 32 selects the second driving mode (wide baseline driving mode) (S102).

When the second driving mode is selected, the key area feature point is extracted from the input image obtained by the image obtaining unit 12 and a descriptor for the key area feature point is generated (S104).

The feature point management unit 34 matches the key area feature point of the input image to the registered key area feature point to confirm the actual position of the mobile robot 10 (S106).

The driving control unit 38 recognizes the position of the mobile robot 10 based on the image matching according to the key area feature point to control the driving thereof (S108).

If the second mode is selected in S102, it is preferable to move the mobile robot 10 backwardly or in a random direction in order to move the mobile robot from the image obtained by the image obtaining unit 12 to an area where the key area feature point can be extracted by the feature point extracting unit 26.

The feature point management unit 34 matches a feature point extracted from an image newly obtained by the image obtaining unit 12 to the registered feature point to determine whether the feature points match each other. In this case, wrong recognition of the feature point often occurs. In order to prevent the wrong recognition of the feature point, the present invention suggests a method that utilizes the local direction information described above and driving direction (heading) information of the mobile robot 10 using the inertial sensor 44.

Figure 7:
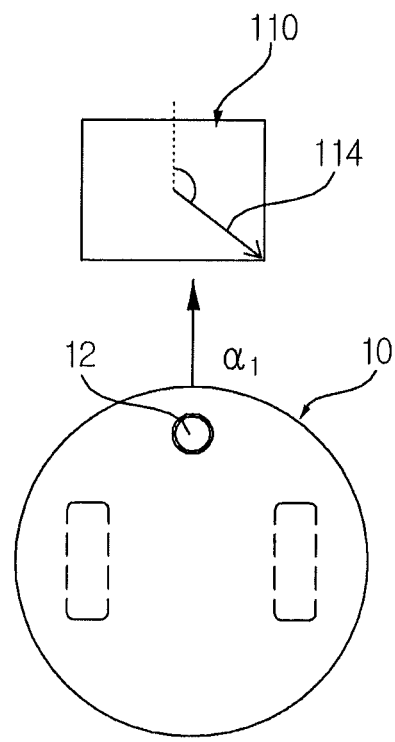
FIG. 7 is a diagram showing a relationship of a driving direction of a mobile robot and a main direction of an image patch in a first position in a mobile robot according to an exemplary embodiment of the invention.
Figure 8:
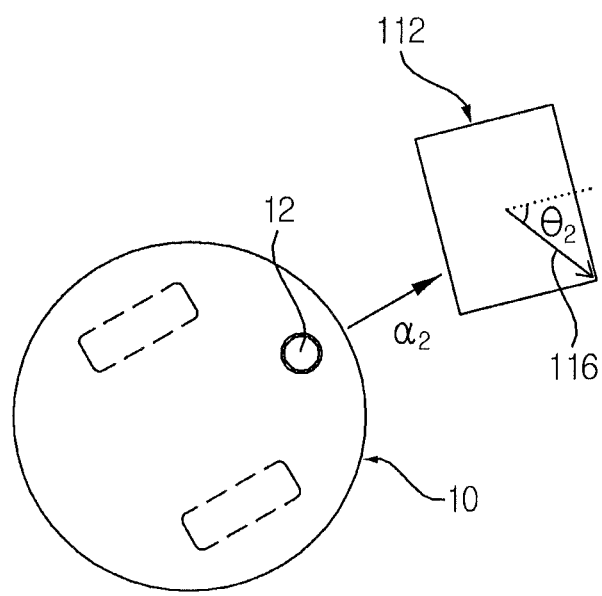
FIG. 8 is a diagram showing a relationship of a driving direction of a mobile robot and a main direction of an image patch in a second position in a mobile robot according to an exemplary embodiment of the invention.

FIG. 7 is a diagram showing a relationship of a driving direction of a mobile robot and a main direction of an image patch in a first position in a mobile robot according to an exemplary embodiment of the invention. FIG. 8 is a diagram showing a relationship of a driving direction of a mobile robot and a main direction of an image patch in a second position in a mobile robot according to an exemplary embodiment of the invention.

For the convenience of description, an image patch in FIG. 7 is referred to as a first image patch 110 and an image patch in FIG. 8 is referred to as a second image patch 112.

As described above, the image patch is obtained by dividing an image in a predetermined range with respect to the feature point. The main directions 114 and 116 of the image patches are set to create the histogram for the phase information on the respective pixels of the image patches and correspond to the peak.

The driving direction of the mobile robot 10 indicates a direction where the mobile robot 10 is driven, and is relatively calculated based on an initial driving direction.

It is assumed that in the first position of FIG. 7, the driving direction of the mobile robot 10 is $\alpha_1$ and the main direction 114 of the first image patch 110 obtained by the image obtaining unit 12 of the mobile robot 10 is $\theta_1$.

It is further assumed that in the second position of FIG. 8, the driving direction of the mobile robot 10 is $\alpha_2$ and the main direction 116 of the second image patch 112 obtained by the image obtaining unit 12 of the mobile robot 10 is $\theta_2$.

Figure 9:
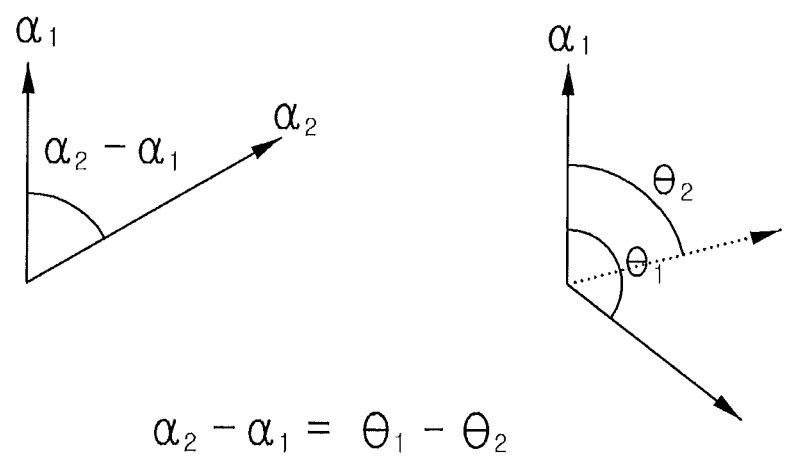
FIG. 9 is a diagram showing a relationship between change in a driving direction of a mobile robot and change in a main direction of an image patch thereby.

If the first image patch 110 and the second image patch 112 are for the same feature point, theoretically, the main direction 116 of the second image patch 112 is relatively changed by the angle at which the driving direction of the mobile robot 10 is changed, as compared with the main direction 114 of the first image patch 110. This is because the image obtaining unit 12 is fixed to the mobile robot 10. This is represented by Equation 8. FIG. 9 is a diagram showing a relationship between change in a driving direction of a mobile robot and change in a main direction of an image patch thereby.

$$\alpha_2 - \alpha_1 = \theta_2 - \theta_1 \qquad \text{[Equation 8]}$$

However, there may be an error in actually calculating the main direction for the image patch with respect to the feature point and obtaining the driving information of the mobile robot. Therefore, Equation 8 cannot be satisfied. Therefore, if the change in the main direction of the image patch according to the change in the driving direction of the mobile robot 10 is within a predetermined range (for example, 45°) as represented by Equation 9, it may be determined that the feature point in the first position is the same as the feature point in the second position.

$$|(\alpha_2 - \alpha_1) - (\theta_2 - \theta_1)| \leq \text{threshold} \qquad \text{[Equation 9]}$$

Whether the difference in the main directions of the image patch in the first position and the second position and the change in the driving direction of the mobile robot 10 satisfy the above condition may be utilized as the following two methods.

First, if it is determined that the feature point in the first position matches the feature point in the second position and the above condition is also satisfied, it is determined that the feature points are same. Second, only if the above condition is satisfied, matching of the feature point in the first position to the feature point in the second position is performed In any of the above cases, the accuracy in the feature point matching can be improved to prevent the wrong recognition of the feature point.

The above description is only illustrative in order to explain the spirit of the present invention, and it will be appreciated by those skilled in the art that various modifications, changes, and substitutions can be made without departing from the essential characteristics of the present invention. Accordingly, the embodiments disclosed in the present invention and the accompanying drawings are used not to limit but to describe the spirit of the present invention, and the scope of the spirit of the present invention is not limited to the embodiments and the accompanying drawings. The protection scope of the present invention must be analyzed by the appended claims and it should be analyzed that all spirits within a scope equivalent thereto are included in the appended claims of the present invention.

The invention claimed is:

1. A mobile robot, comprising:
an image sensor configured to obtain an image;
a second sensor configured to obtain driving information including at least a driving direction and a driving distance of the mobile robot;
a processor configured to process the image obtained by the image obtaining unit to extract a feature point and generate a descriptor for the feature point; and
a main controller configured to generate a spatial map in a driving range based on the feature point and the driving information, and control localization and navigation of the mobile robot,
wherein when the localization and the navigation of the mobile robot are performed, the main controller selectively applies a first driving mode that simultaneously uses the image and the driving information when the matching degree of the obtained image and a reference image meet a threshold, and the main controller selectively applies a second driving mode that uses only the image information when the matching degree of the obtained image and a reference image do not meet the threshold;
wherein the processor generates change in brightness and direction information for n×n sub regions divided from the obtained image and selects direction information of different two sub regions in the n×n sub regions to generate a pair-wise combination to describe the angle difference in local direction information, and thereby generates the descriptor based on the pair-wise combination.

2. The mobile robot of claim 1, further comprising:
an electronic memory configured to store the driving information including the driving direction and the driving distance of the mobile robot obtained by the second sensor and image information including the feature point obtained by the image processing in the processor and descriptor information.

3. The mobile robot of claim 1, wherein the processor is configured to:
correct the distortion of the image obtained by the image sensor;
determine whether the image is available;
extract the feature point from the image; and
generate a descriptor for the feature point.

4. The mobile robot of claim 3, wherein the processor determines the availability of the obtained image by comparing a brightness of the obtained image and a brightness of the reference image.

5. The mobile robot of claim 4, wherein when the image sensor obtains an abnormal image in the first driving mode and a time when the abnormal image is obtained exceeds a predetermined time, the processor determines that the mobile robot is blocked in a block area.

6. The mobile robot of claim 5, wherein the processor determines whether the image sensor is blocked, based on an average and a variation of the brightness of the obtained image.

7. The mobile robot of claim 3, wherein the processor divides the obtained image into four sections with reference to a moving direction of the mobile robot and determines whether the mobile robot is blocked based on an average and a variation of the obtained image based on the brightness average in the divided sections.

8. The mobile robot of claim 4, wherein if it is determined that the mobile robot is blocked in the block area, the main controller returns the mobile robot to an entering point of the block area.

9. The mobile robot of claim 1, wherein the main controller is configured to:
select the first driving mode and the second driving mode;
manage the feature point extracted from the image and match to the registered feature point;
generate and update the map; and
control the localization and navigation of the mobile robot.

10. The mobile robot of claim 9, wherein when the mobile robot is kidnapped while driving in the first driving mode or fails to establish a metric map or localize during a predetermined image frame, the main controller switches the driving mode to the second driving mode to restore the position in accordance with a topological map.

11. A control method of localization and navigation of a mobile robot, comprising:
(a) allowing the mobile robot to obtain image information via an image sensor and driving information of a target region via a second sensor;
(b) determining, via a processor, whether the obtained image is available by comparing a quality of the obtained image information with a reference value; and
(c) if it is determined that the image is available, extracting a feature point from the obtained image information, via a processor, and generating a descriptor of the extracted feature point via a main controller to create a driving map and drive in the target region;
wherein when the localization and the navigation of the mobile robot are performed, the driving in the target region includes: selecting any one of a first driving mode that simultaneously uses the image and the driving information when the matching degree of the obtained image and a reference image meet a threshold, and a second driving mode that uses only the image information when the matching degree of the obtained image and the reference image do not meet the threshold; and
wherein the processor generates change in brightness and direction information for n×n sub regions divided from the obtained image and selects direction information of different two sub regions in the n×n sub regions to generate a pair-wise combination to describe the angle difference in local direction information and thereby generates the descriptor based on the pair-wise combination.

12. The control method of claim 11, before (b), further comprising:
correcting distortion of the obtained image information.

13. The control method of claim 11, wherein the generating of the descriptor includes:
generating a descriptor including at least direction information and brightness information for the feature point;
registering the feature point if the feature point is determined as a new feature point;
generating a descriptor for a key area feature point when the feature point is the key area feature point that represents a feature of a predetermined region; and
registering the key area feature point if the key area feature point is determined as a new key area feature point.

14. The control method of claim 13, wherein the key area feature point is spatially uniformly generated in the obtained image and set in a region where the sum of values of a corner response function calculated from an image in one frame is larger than a reference value.

15. The control method of claim 13, wherein the mobile robot corrects a positional error accumulated by the image matching of the feature point obtained in the key area and the key area feature point and a direction angle error.

16. The control method of claim 11, wherein when the brightness of the image obtained by the mobile robot in the first driving mode is below a reference and a time when the image below the reference is obtained exceeds a predetermined time, it is determined that the mobile robot is blocked in a block area.

17. The control method of claim 16, wherein if it is determined that the mobile robot is blocked in the block area, the mobile robot is returned to an entering point of the block area.

18. The control method of claim 16, wherein it is determined whether the mobile robot is blocked based on an average and a variation of the obtained image based on the brightness average in sections divided by dividing the obtained image into four sections with reference to a moving direction of the mobile robot.

* * * * *